United States Patent [19]
Schmidt

[11] 3,874,145
[45] Apr. 1, 1975

[54] COVERING- OR SEALING-APPARATUS FOR FOOD-CONTAINERS WHICH ARE FILLED, PREFERABLY, WITH FROZEN FOODS

[76] Inventor: Max Schmidt, Brauhausstrasse 17, 8800 Ansbach, Germany

[22] Filed: Aug. 7, 1973

[21] Appl. No.: 386,434

Related U.S. Application Data

[63] Continuation-in-part of Ser. No. 150,996, June 8, 1971, abandoned.

[52] U.S. Cl.................................. 53/112 R, 53/372
[51] Int. Cl.............................................. B65b 31/02
[58] Field of Search.............. 53/112 A, 112 R, 372

[56] References Cited
UNITED STATES PATENTS

| | | | |
|---|---|---|---|
| 3,196,590 | 7/1965 | Ollier et al. | 53/112 A |
| 3,260,032 | 7/1966 | Hill et al. | 53/112 A |
| 3,325,969 | 6/1967 | Bemiss et al. | 53/373 X |
| R27,136 | 6/1971 | Schmidt | 53/112 R X |

Primary Examiner—Travis S. McGehee
Attorney, Agent, or Firm—Holman & Stern

[57] ABSTRACT

The invention provides an apparatus for covering and sealing with a sheet, food containers such as ready-for-sale food-trays or -bowls filled in particular with frozen foods, the apparatus being of the type which includes a heating zone with a heating means, a sealing device and a punch-cutter device arranged serially so as to deliver sealed food packages, with any excess of the covering sheet trimmed off the packages. The sealing device and the punch-cutter device are each in two complementary parts constituted by a stationary upper part, and a vertically movably mounted lower part. The lower parts are advantageously activated by piston mechanisms. The sealing device and the punch-cutter device are both under the influence of vacuum means; they are both preferably provided with an edge of polytetrafluoroethylene at the mating edges of the stationary upper parts so as to prevent the operating edges from sticking to the edges of the containers being sealed and trimmed. The sealing and punch-cutter devices advantageously incorporate secondary heating means in their upper parts. The apparatus may include a means to collect the waste sheet issuing after the sealing and trimming operations, the waste collecting means including a roller driven by a rack and pinion mechanism with a slip clutch. The rack may be operated by a piston mechanism. The heating zone is advantageously adapted to span at least two containers on a conveyor, and the arrangement minimizes wastages and escape of heat, at the same time providing a continuous, fast and efficient method of delivering sealed and trimmed food packages.

11 Claims, 7 Drawing Figures

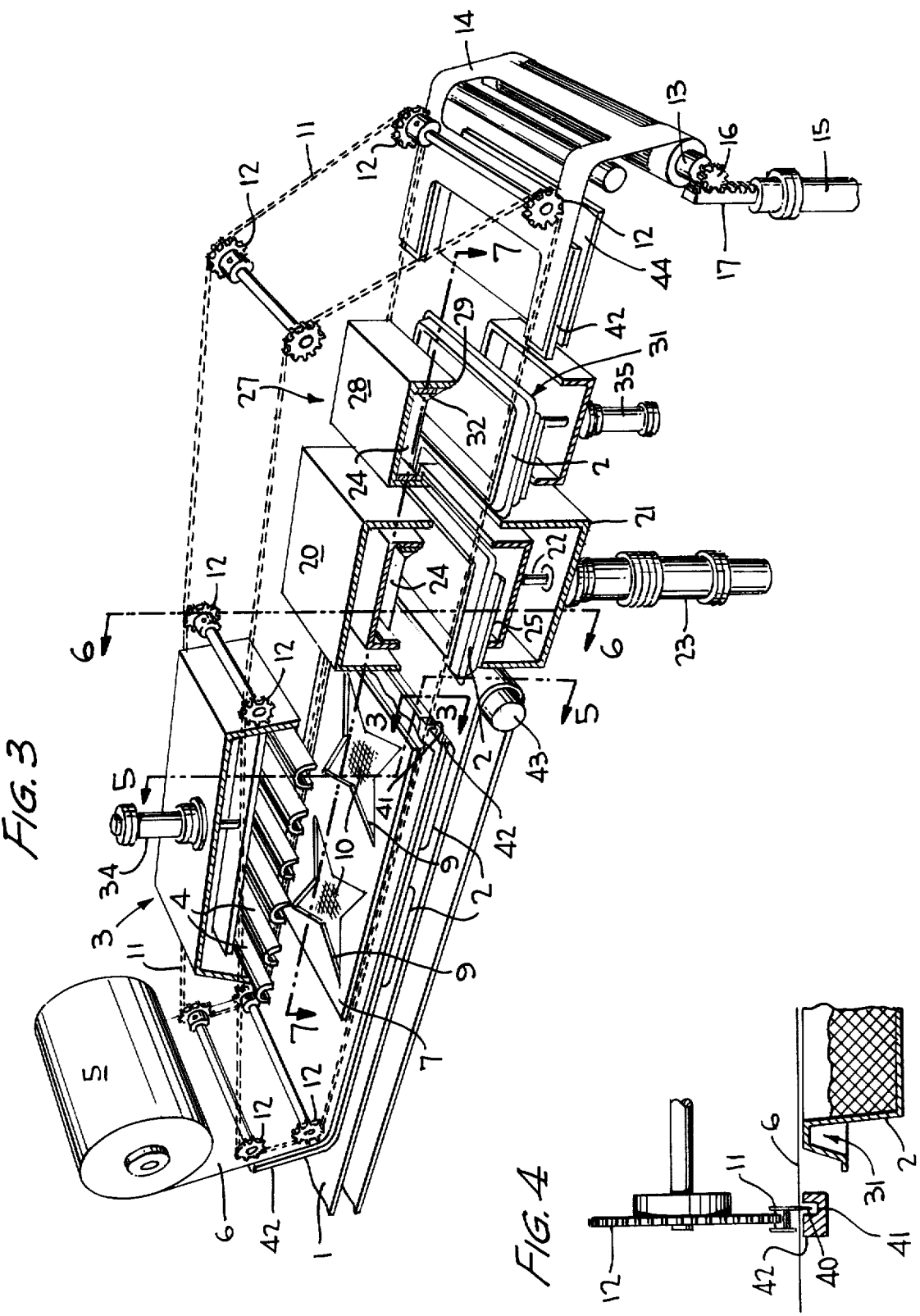

COVERING- OR SEALING-APPARATUS FOR FOOD-CONTAINERS WHICH ARE FILLED, PREFERABLY, WITH FROZEN FOODS

This application comprises a continuation-in-part of co-pending application Ser. No. 150,996, filed June 8, 1971, which was abandoned in favor of the present application.

FIELD OF INVENTION

The instant invention concerns a covering or sealing apparatus for containers such as food-bowls, etc., to be sealed with a foil or thin sheet of thermoplastic material, the container being filled, preferably, with frozen foods.

DESCRIPTION OF THE PRIOR ART

A device is known in prior art for conserving and sealing of a food-tray of a thermoplastic material which is filled especially with frozen foods. The sealing device comprises a heating unit, a sealing tool and a separator device all arranged in one assemblage. These tool units, which are each designed in two parts, are affixed one each to two piston rods, which are arranged so as to be vertically directed towards each other, and are synchronously and generally pneumatically operable. See, for example, U.S. Pat. No. 3,298,158, to SCHMIDT, issued Jan. 17, 1967.

It has now been proven that this combined arrangement of devices, i.e., the concentration of tools in a comparatively narrow space is very detrimental for a smooth flow of production of the required sealed containers. For instance, the heat source is subjected to extreme detrimental influences by means of the synchronized opening and closing of the double-chamber with the escaping and re-entering air connected thereto, and further, the associated mechanism, since it has to comprise several synchronized components in a limited space, is complicated and expensive, particularly since each tool unit is provided with two cylinders which are vertically arranged above each other.

Heating devices for thin-sheet covers, and sealing-punching tools per se are known in packing machines. However, these represent in most cases a packing unit or packing container for the reception of filler-goods of insensitive contents such as small goods, candy, etc. whereby especially the high temperature during the plastification of the covering sheet in no way affects the packing contents. In addition, in the known packing processes, mostly packing containers of smaller volumes are involved, which are sealed by means of substantially simple sealing tools, on conveyor means.

SUMMARY OF THE INVENTION

It is the object of the instant invention to provide an efficient covering-sealing-device for food-bowls or similar containers which are filled with frozen foods; the device comprises in general a sealing device which is arranged in a vacuum chamber for sealingly securing a covering sheet which is supplied from a supply-roll; and a punch-cutter device. Also provided is a heating device which is in series with a vacuum chamber, a conveyor means for covering sheet extending the entire length of travel through the working stages and a device for the rewinding of the sheet-waste, representing the amount of the sheet length less the amount which has been punched out as covers for the containers. The components are arranged so that the heating device, the sealing device and the punch-cutter device in combination form a synchronously controlled working assembly.

In one embodiment of the invention, the heating device is designed as a pre-heater and main-heater unit to be applied at least on two container-units simultaneously. The heating device may have a fixed thermal radiation device below which is arranged a heating mask with openings covered by a mesh-screen. The upper section of the sealing device and the upper section of a separator unit of the punch-cutter may be supplied with a layer of polytetrafluoroethylene at the regions which come in contact with the respective lower sections of the tool, to enable easy separation of parts.

The apparatus may comprise a combined sealing- and removal-device, fixedly arranged in the upper part while the lower part is vertically movably arranged to be actuated by means of a two-stage cylinder. Finally, the covering sheet-waste which issues during the manufacturing process may be collected by being rolled up by means of a rack and pinion arrangement provided with a slip clutch and actuated by a piston-cylinder unit.

BRIEF DESCRIPTION OF DRAWING

Details of the instant invention as well as its operation are described by means of an exemplary preferred embodiment which is illustrated and described with respect to the attached drawing in which:

FIG. 3 is a perspective view looking at the side of the apparatus shown in FIG. 1, with portions broken away and shown in section;

FIG. 4 is an enlarged fragmentary section taken substantially on the plane of line 4—4 of FIG. 3;

DESCRIPTION OF PREFERRED EMBODIMENT

Figure 1:
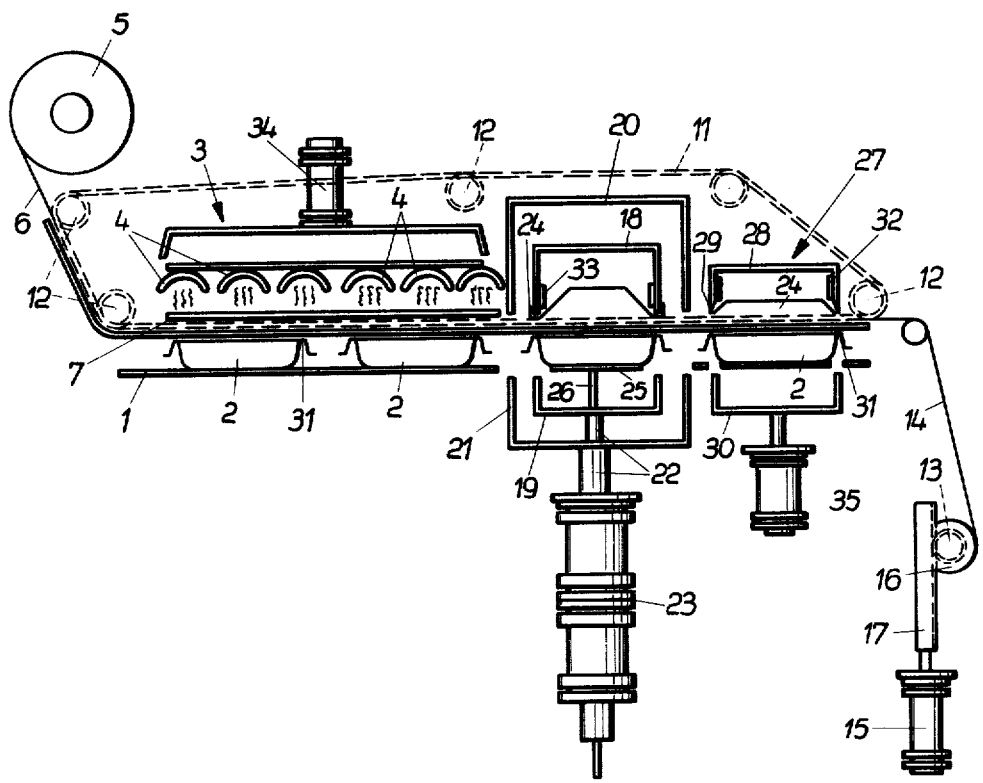
FIG. 1 shows a schematic side view of the sealing apparatus.

The apparatus is a sealing device, especially for producing ready-for-sale food-package units which are filled and prepared flat bowls or trays, and which are covered with a sheet and sealed by means of a sealing device and then delivered out of the apparatus for preservation of the food.

Indicated at 1 is a conveyor belt on which the filled food-containers 2 are transported in sequence of the working-cycle of the individual devices. Indicated at 3 is a heating device whose longitudinal dimension covers at least two consecutively transported containers 2. Heat is supplied uniformly from the heat radiators 4, to the top of the containers and the covering portion of a sealable covering sheet 6.

In order to ensure an even distribution of heat on the covering sheet 6 which is provided from a supply roll 5, and to isolate the area to be plastified, a heating mask 7 is provided parallel, closely adjacent to the path of travel of the covering sheet 6, and of dimensions substantially underlying the heating device 3. The heating mask 7 is provided with openings 9, and with a mesh-screen 10, for ensuring uniform application of heat on the sheet or film.

The covering sheet 6 is moved along the entire length of the conveyor through the working stations by means of continuous chains 11 which transversely spaced chains are supplied with gear-teeth or pins 41, which chains engage guide wheels 12, and whereby the waste or scrap portion of said band is remaining, after the punching process, is wound up on a roller 13 as waste 14, this is accomplished by means of a rack and pinion mechanism 16, 17, actuated by a piston in a cylinder 15 and provided with a suitable slip clutch.

The sealing process is performed in a known manner. The upper part of sealing tool 18 and the lower part 19 of the sealing tool are positioned in a hollow space comprising a vacuum tank. The upper tool section 18 and upper tank section 20 are fixedly arranged, while the corresponding counter-elements, namely, the lower tool section 19 and the lower vacuum tank section 21 are arranged to be raised vertically and lowered by the piston rod 22 which is activated by a two-stage cylinder 23.

For better durability of the sealing seam, and in order to prevent the sticking or adhering of the covering-sheet to a welding edge of the upper tool section 18, which might be caused by the welding heat, the welding edge is framed by a layer 24 consisting of polytetrafluoroethylene.

During the sealing process, the container 2 is moved from conveyor 1 onto a platform-shaped seat 25 which is supported by a central rod 26. At this position, the sealing tool functions under the influence of the vacuum tanks 20, 21, and attaching a container 2 to sheet 6 after a short distance of travel, the container is conveyed by sheet 6 at the same level and stopped at a punch-cutter device 27; this device in general consists of a stationary upper part 28 having an angular edge 29, and complementary movable arm brackets 30. The brackets 30 grippingly engage a hollow space 31 of the container 2, see FIG. 4, and press the periphery of the containers against the angular edge 29 which is moved over a heating band 32 and brought to the required working temperature, whereby a clean separation of the sealed container 2 from the punched or cut band of the covering sheet 6 is ensured. The heating of the band 32, and also the heating band 33 of the upper sealing tool section 24, is maintained continuously as long as the entire apparatus is in operation. The movements of the heater device 3 and the punch-cutter device 27 are actuated by cylinders 34 and 35, respectively.

Although the sheet 6 covering a container 2 is severed, the sheet 6 will still be disposed about the now-covered container and as the scrap material 14 is collected on roller 13, the covered container is moved onto table 44.

As seen in FIGS. 3-6, the apparatus includes parallel guide tracks 42 extending longitudinally of the path of travel of web 6 over which the edges thereof overly. The pins 41 on chains 11 penetrate the web 6 and move it along the track through the operation station; it will be noted that the pins 40 project into an upwardly opening groove 41 formed with guide tracks 42.

Figure 5:
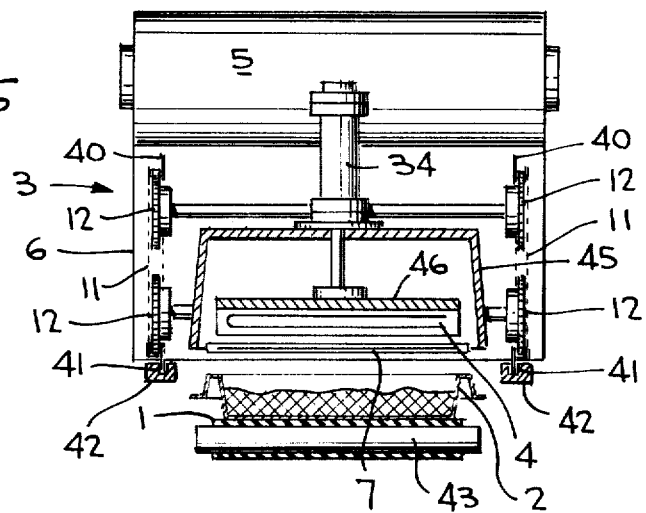
FIG. 5 is a vertical section taken substantially on the plane of line 5—5 of FIG. 3.
Figure 6:
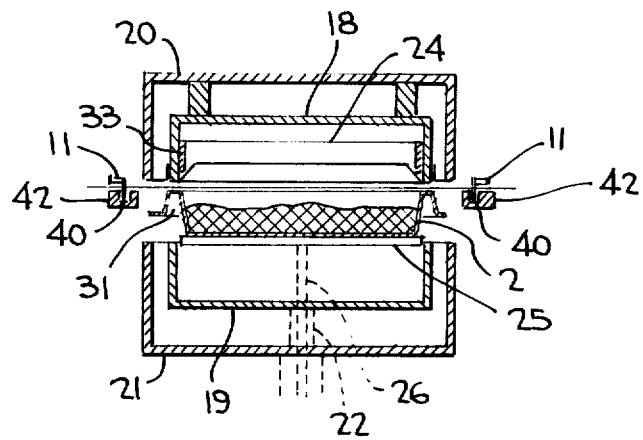
FIG. 6 is a vertical section taken substantially on the plane of line 6—6 of FIG. 3.

As seen in FIG. 5, the endless chains 11 and tracks 40 are spaced sufficiently to accommodate for reciprocating movement of member 45 of heater 3 and elements 19, 21 and 30 therebetween.

Figure 2:
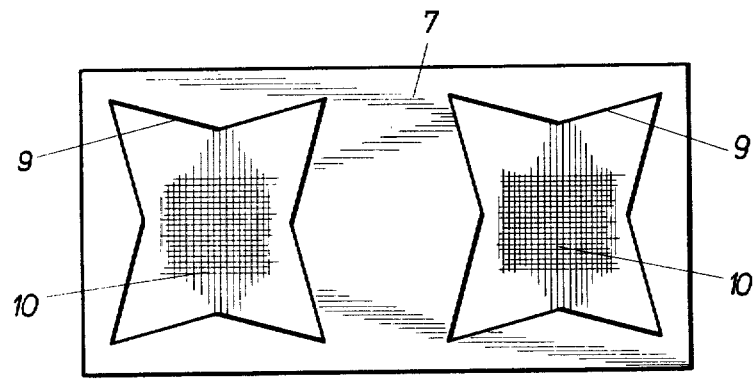
FIG. 2 shows a top view of a cover, which is referred to as a heating mask.
Figure 7:
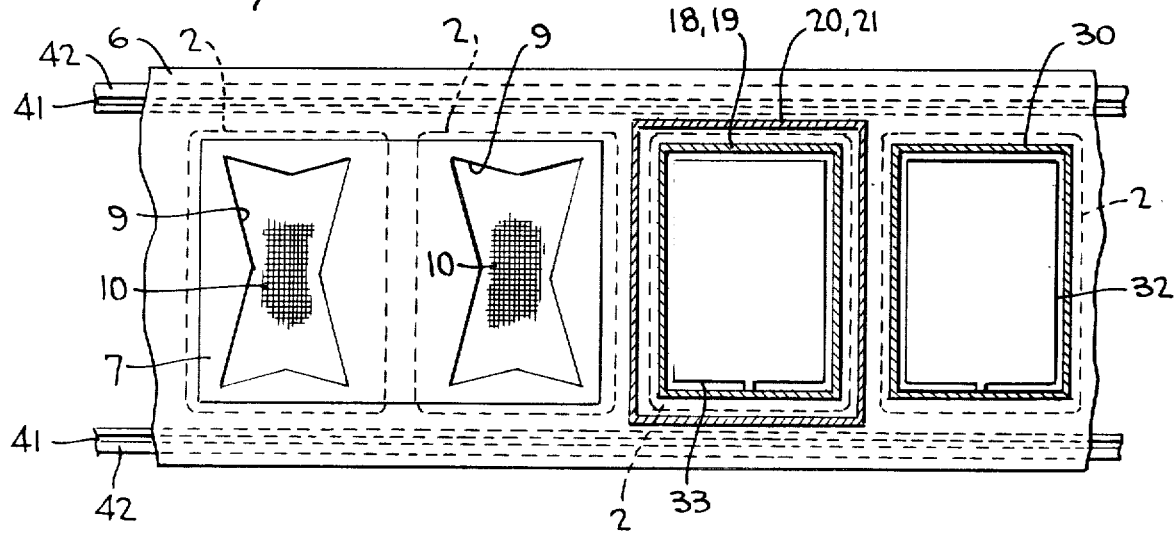
FIG. 7 is a fragmentary horizontal sectional view taken substantially on the plane of line 7—7 of FIG. 3.

Further, the mask 7 is generally star-shaped as seen in FIGS. 2 and 7 whereby the converging angular corners cause the heat-sealable web at the corners of the trays 2 being covered to be pre-heated as well as the outer portion of the web covering the food-filled trays to insure proper sealing of the corners.

Briefly, in review, food-filled trays 2 are first received on conveyor 1, pass beyond roll 43; pass onto platform-shaped supports 25 (the conveyor chains 11, 41 and web 6 are stopped at the heat sealing means 18, 19 and vacuumforming tank elements 20, 21 elements 20, 21 are moved together at their confronting edges and elements 18, 19 are engaged to form the peripheral seal above the web 6 now engaged on the food-filled trays 2; thereafter, the food-filled containers with the web sealed thereto move to the puncher-cutter drive 27, conveying is stopped, and element 30 moves upwardly to engage edge 29 of the element 28 to sever the covered food tray from web 6, however, web 14 still embraces the covered container sufficiently to move the container and as scrap web portion 14 is salvaged on roller 13, the covered trays move onto output table 44.

As seen in FIG. 5, the heaters 4 are enclosed in a cap or housing 45 and are mounted in transverse downwardly opening elements 46.

Appreciating the complexity of the apparatus, it will be appreciated that specific supports for the various elements and specific frame details are not shown as well as the conveyor indexing details and/or details of the vacuum system. These are all expedients conventional in this art and these mechanical details are known to those skilled in the art.

What is claim is:

1. In an apparatus for covering and sealing with a thin, thermoplastic sheet, food-containers such as ready-for-sale food trays filled in particular with frozen foods, the apparatus being of the type comprising a serial-arrangement along a conveyor; a heating means and a heating zone for pre-heating the sheet in a region of the container to be heat-sealed; a sealing device downstream of said heating means and zone including complementary parts including means to seal the container to the sheet; and a punch-cutter device for separating unused marginal portions of the sheet surrounding the area sealing to the container; the improvement comprised in that: the sealing device includes a stationary first half and a complementary movably mounted second half, means for subjecting both the halves to the influence of vacuum and comprising correspondingly stationary and movably mounted first and second halves for forming a vacuum tank when sealing is effected; and the punch-cutter device includes a stationary first half and a complementary movably mounted second half.

2. The apparatus as claimed in claim 1, in which said heating means provides pre-heating for the thermoplastic sheet and forms a primary heater including means adapted to cover at least two food-containers, the apparatus including secondary heating means provided in the sealing device and said punch-cutter device.

3. The apparatus as claimed in claim 2, in which the primary heater includes stationary heat-emitters below which is arranged a fixed heat mask overlying the sheet to be heat-sealed and having apertures covered by a mesh.

4. The apparatus as claimed in claim 3, in which said stationary first half components of the sealing device and punch-cutter device are each arranged vertically above their said complementary half and are provided with a covering of polytetrafluoroethylene at their working edges, where they abut said complementary halves.

5. The apparatus as claimed in claim 4, in which said complementary second halves of the sealing device and punch-cutter device are each arranged to be vertically movable by means of a piston in a cylinder.

6. The apparatus as claimed in claim 1, wherein a supply roll feeds the sheet continuously into said heating zone.

7. The apparatus as claimed in claim 6, which further includes a mechanism to collect unused marginal portions of the sheet as waste, the mechanism comprising a roller adapted to be rotated by means of a rack and pinion arrangement actuated by a piston and provided with a slip clutch.

8. The apparatus as claimed in claim 1 including a supply source of theremoplastic material including a web extending transversely of the conveyor; parallel guide tracks flanking the path of travel of the containers for supporting the web at its longitudinal edges; endless conveyor chains flanking the longitudinal path of travel of said conveyor means and said web and including means for engaging the web and moving the web along said guide trackes, said sealing device being disposed between said guide tracks and between which said movable halves of said sealing punch-cutter devices are disposed.

9. The structure as claimed in claim 3 in which said fixed heat mask apertures are star-shaped and have converging margins for converging at corresponding corners of the containers being covered by the thermoplastic sheet whereby heat is concentrated at the center and corners of the containers being covered.

10. The structure as claimed in claim 1 in which said sealing device includes a support above the movable half for receiving a container thereon, and means supporting said movable half for movement from beneath said support and movable vertically therebeyond for engagement with said stationary first half.

11. The structure as claimed in claim 8 in which said guide tracks, in conjunction with said web, form conveyor means for the covered containers after a seal is effected whereby the web movement positions the container beneath said punch-cutter device.

* * * * *